US010769804B2

(12) United States Patent
Ohara

(10) Patent No.: US 10,769,804 B2
(45) Date of Patent: Sep. 8, 2020

(54) PARALLAX CALCULATION APPARATUS, STEREO CAMERA APPARATUS, VEHICLE, AND PARALLAX CALCULATION METHOD

(71) Applicant: KYOCERA Corporation, Kyoto-shi, Kyoto (JP)

(72) Inventor: Naoto Ohara, Yokohama (JP)

(73) Assignee: KYOCERA CORPORATION, Kyoto (JP)

(*) Notice: Subject to any disclaimer, the term of this patent is extended or adjusted under 35 U.S.C. 154(b) by 0 days.

(21) Appl. No.: 15/769,849

(22) PCT Filed: Oct. 21, 2016

(86) PCT No.: PCT/JP2016/004658
§ 371 (c)(1),
(2) Date: Apr. 20, 2018

(87) PCT Pub. No.: WO2017/068792
PCT Pub. Date: Apr. 27, 2017

(65) Prior Publication Data
US 2018/0315208 A1 Nov. 1, 2018

(30) Foreign Application Priority Data
Oct. 22, 2015 (JP) ................ 2015-208242

(51) Int. Cl.
*G06T 7/593* (2017.01)
*G06T 1/00* (2006.01)
*G01C 3/06* (2006.01)
*G01C 11/32* (2006.01)
*H04N 13/128* (2018.01)
*G01C 3/08* (2006.01)
*H04N 13/00* (2018.01)

(52) U.S. Cl.
CPC ............... *G06T 7/593* (2017.01); *G01C 3/06* (2013.01); *G01C 3/085* (2013.01); *G01C 11/32* (2013.01); *G06T 1/00* (2013.01); *H04N 13/128* (2018.05); *G06T 2207/10012* (2013.01); *G06T 2207/30252* (2013.01); *H04N 2013/0081* (2013.01)

(58) Field of Classification Search
CPC .............................. H04N 13/128; G06T 7/593
See application file for complete search history.

(56) References Cited

U.S. PATENT DOCUMENTS

| 9,443,313 | B2 | 9/2016 | Muramatsu et al. |
| 2012/0327189 | A1* | 12/2012 | Muramatsu ............... G01C 3/06 348/46 |
| 2015/0339825 | A1 | 11/2015 | Muramatsu et al. |

FOREIGN PATENT DOCUMENTS

| JP | 2006-226878 A | 8/2006 |
| JP | 2008-298533 A | 12/2008 |

(Continued)

Primary Examiner — Girumsew Wendmagegn
(74) Attorney, Agent, or Firm — Hauptman Ham, LLP

(57) ABSTRACT

A parallax calculation apparatus includes an acquisition unit and a controller. The acquisition unit acquires a standard image and a reference image captured by a stereo camera. From each of the standard image and the reference image, the controller extracts lines from a plurality of lines parallel to a first direction in an image space corresponding to a baseline direction of a three-dimensional coordinate space. The controller calculates a parallax between the standard image and the reference image based on a plurality of pixels included in the extracted lines.

12 Claims, 14 Drawing Sheets

(56) References Cited

FOREIGN PATENT DOCUMENTS

| JP | 2011-191905 A | 9/2011 |
|---|---|---|
| WO | 2009/101687 A1 | 8/2009 |

\* cited by examiner

FIG. 9A Thinned-out parallax image

FIG. 9B Interpolated parallax image

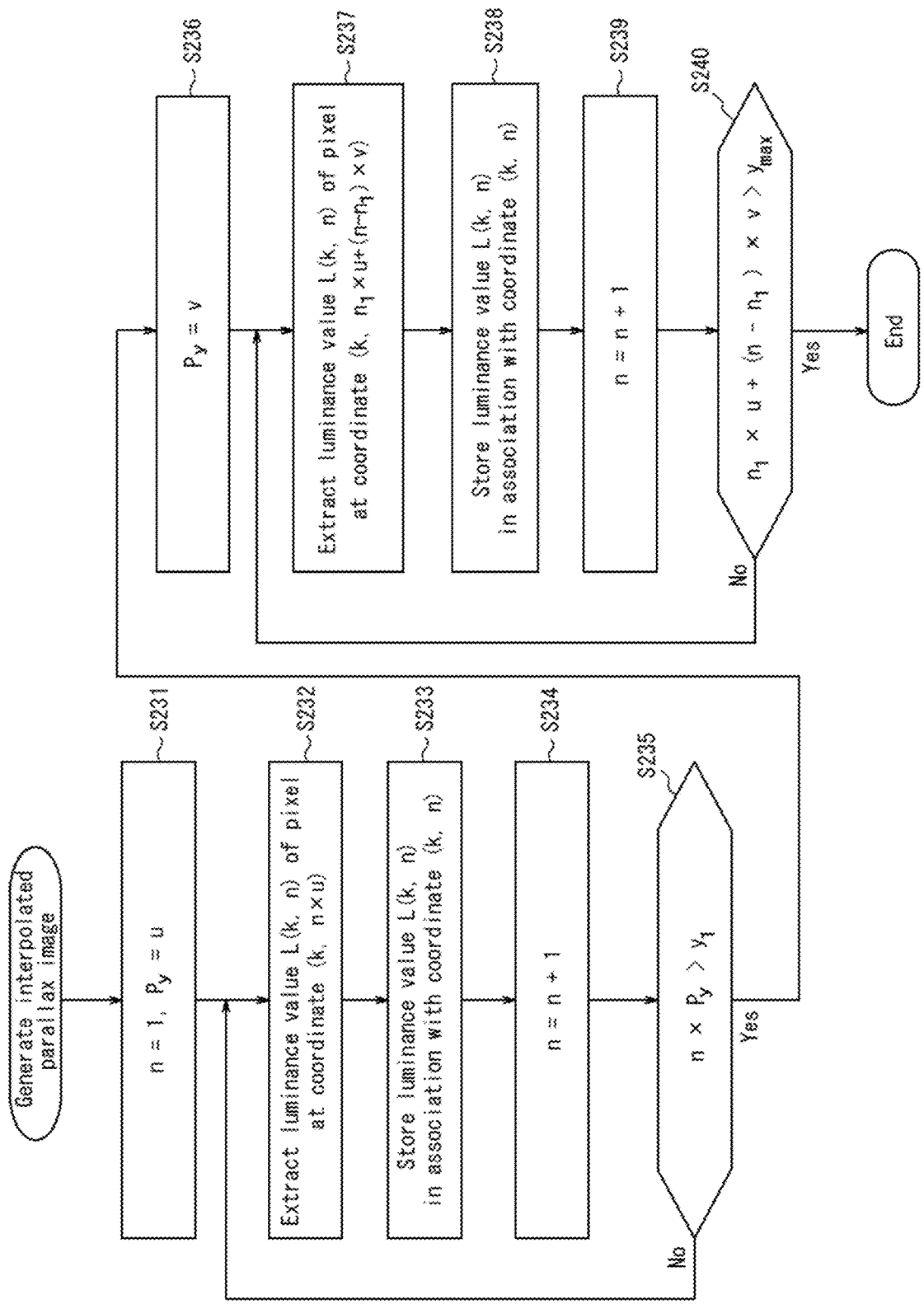

PARALLAX CALCULATION APPARATUS, STEREO CAMERA APPARATUS, VEHICLE, AND PARALLAX CALCULATION METHOD

CROSS REFERENCE TO RELATED APPLICATION

This application claims priority to and the benefit of Japanese Patent Application No. 2015-208242 filed on Oct. 22, 2015, the entire contents of which are incorporated herein by reference.

TECHNICAL FIELD

The present disclosure relates to a parallax calculation apparatus, a stereo camera apparatus, a vehicle, and a parallax calculation method.

BACKGROUND

Recently, stereo camera apparatuses for measuring a distance to a subject by using a plurality of cameras mounted on a vehicle such as an automobile are known.

For detection of a three-dimensional object and measurement of a distance by using the stereo cameras, a method to acquire parallax at positions in an image is known. That is, the stereo camera sets two captured images as two standard images and vertically and horizontally subdivides the standard images into regions. The stereo camera evaluates the regions of the standard images sequentially, e.g., one pixel at a time, in a baseline direction in the standard images. The baseline direction corresponds to a direction connecting optical centers of two cameras of the stereo camera.

SUMMARY

A parallax calculation apparatus according to the present disclosure includes an acquisition unit and a controller. The acquisition unit acquires a standard image and a reference image captured by a stereo camera. The controller, from each of the standard image and the reference image, extracts lines from a plurality of lines parallel to a first direction in an image space corresponding to a baseline direction of a three-dimensional coordinate space. The controller calculates parallaxes of the standard image and the reference image based on a plurality of pixels included in the extracted lines. Note that the plurality of lines do not need to be exactly "parallel to" the first direction but may allow for a certain range of displacement.

A stereo camera apparatus according to the present disclosure includes a stereo camera and a parallax calculation apparatus. The parallax calculation apparatus includes a controller. The controller, from each of a standard image and a reference image captured by the stereo camera, extracts lines from a plurality of lines parallel to a first direction in an image space corresponding to a baseline direction of a three-dimensional coordinate space. The controller calculates parallaxes of the standard image and the reference image based on a plurality of pixels included in the extracted lines. The controller calculates a parallax of each pixel included in the extracted lines.

A vehicle according to the present disclosure includes a stereo camera apparatus. The stereo camera apparatus includes a stereo camera and a parallax calculation apparatus. The parallax calculation apparatus includes a controller. The controller, from each of a standard image and a reference image captured by the stereo camera, extracts lines from a plurality of lines parallel to a first direction in an image space corresponding to a baseline direction of a three-dimensional coordinate space. The controller calculates parallaxes of the standard image and the reference image based on a plurality of pixels included in the extracted lines.

A parallax calculating method according to the present disclosure is performed by a parallax calculation apparatus that includes an acquisition unit and a controller. The acquisition unit acquires a standard image and a reference image captured by a stereo camera. The controller, from each of a standard image and a reference image, extracts lines from a plurality of lines parallel to a first direction in an image space corresponding to a baseline direction of a three-dimensional coordinate space. The controller calculates a parallax between the standard image and the reference image based on a plurality of pixels included in the extracted lines.

BRIEF DESCRIPTION OF THE DRAWINGS

In the accompanying drawings:

FIGS. 2A and 2B are diagrams illustrating examples of images captured by the stereo camera illustrated in FIG. 1, wherein FIG. 2A illustrates an example of a standard image, and FIG. 2B illustrates an example of a reference image;

FIGS. 4A and 4B are diagrams illustrating pixels extracted by an extraction unit from the images illustrated in FIGS. 2A and 2B, wherein FIG. 4A illustrates pixels extracted from the standard image, and FIG. 4B illustrates pixels extracted from the reference image;

FIGS. 5A and 5B are diagrams illustrating examples of extracted images generated by the extraction unit, wherein FIG. 5A illustrates an example of an extracted standard image, and FIG. 5B illustrates an example of an extracted reference image;

FIGS. 9A and 9B are diagrams illustrating a process for generating the interpolated parallax image from the extracted parallax image;

FIGS. 14A and 14B are diagrams illustrating examples of pixels extracted from the images illustrated in FIGS. 2A and 2B by the extraction unit according to the embodiment, wherein FIG. 14A illustrates pixels extracted from the reference image, and FIG. 14B illustrates pixels extracted from the standard image; and FIG. 15 is a flowchart illustrating detail of an example of an extracted image generation process performed by the extraction unit according to the embodiment.

DETAILED DESCRIPTION

Conventional parallax calculation methods require comparison of luminance values of all pixels within a parallax detection region and thus often result in a high processing load.

The present disclosure may reduce the processing load involved in measurement of parallax. Hereinafter, one of a plurality of embodiments of the present disclosure will be described with reference to the drawings.

Figure 1:
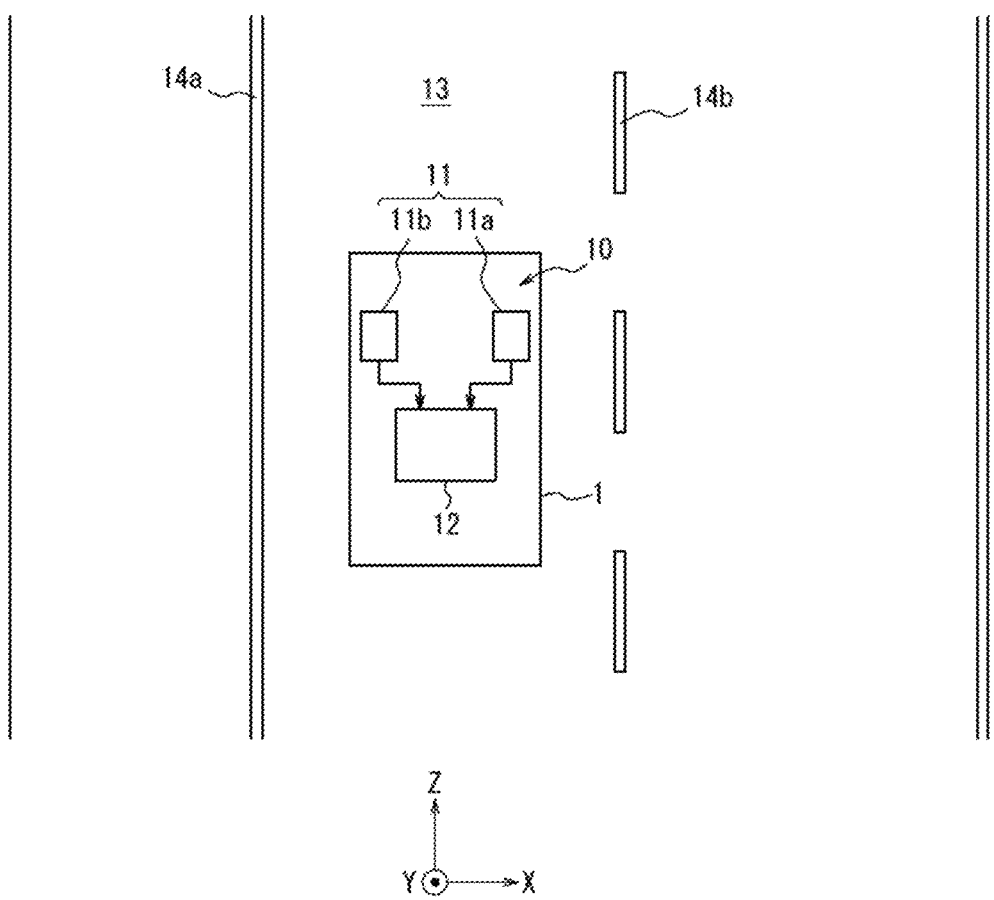
FIG. 1 is a simplified diagram illustrating a vehicle that is equipped with a stereo camera apparatus and is traveling on the road.

FIG. 1 is a simplified diagram illustrating a vehicle 1 that is equipped with a stereo camera apparatus 10 and is traveling on the road. In the three-dimensional coordinate space illustrated in FIG. 1, the Z direction represents a traveling direction of the vehicle 1 (the upward direction in the figure), the X direction represents a width direction of the vehicle 1 (the right direction in the figure), and the Y direction represents a height direction (the direction perpendicular to the diagram) perpendicular to the X direction and the Z direction. The term "vehicle" used herein encompasses, but is not limited to, automobiles, railway vehicles, industrial vehicles, and vehicles for daily life. The term vehicle may encompass, for example, aircraft that travel on a runway. Automobiles may include any vehicle for traveling on the road such as, but not limited to, a cars, trucks, buses, motorcycles, and a trolleybuses. Railway vehicles may include vehicles for traveling along a track, such as, but not limited to, locomotives, freight cars, passenger coaches, trams, guide track railways, aerial trams, cable cars, linear motor trains, and monorails. Industrial vehicles include agricultural vehicles and construction vehicles. Industrial vehicles include, but are not limited to, forklifts and golf carts. Agricultural vehicles include, but are not limited to, tractors, tillers, transplanters, binders, combine harvesters, and lawn mowers. Construction vehicles include, but are not limited to, bulldozers, scrapers, excavators, crane trucks, dump trucks, and road rollers. Vehicles for daily life include, but are not limited to, bicycles, wheelchairs, strollers, wheelbarrows, and electric stand-on two-wheeled vehicles. Power units for the vehicle include, but are not limited to, internal combustion engines such as diesel engines, gasoline engines, and hydrogen engines, and electrical engines equipped with motors. The vehicles include vehicles that travel under human power. The classification of the vehicle is not limited to the above. For example, automobile may include industrial vehicles that can travel on the road, and a plurality of classifications may include the same vehicles.

The stereo camera apparatus 10 includes a stereo camera 11 and a parallax calculation apparatus 12. The stereo camera 11 includes two cameras: a first camera 11a positioned on the right side and a second camera 11b positioned on the left side, both with respect to the traveling direction (the Z direction). The parallax calculation apparatus 12 is electrically connected to the stereo camera 11. The term "stereo camera" refers to a plurality of cameras having a parallax therebetween and configured to cooperate with one another. The stereo camera includes at least two cameras. The stereo camera is capable of capturing a subject from a plurality of directions by causing a plurality of cameras to cooperate with one another. The stereo camera includes the capability to simultaneously capture a subject by causing a plurality of cameras to cooperate with one another. Note that such "simultaneous" capture does not necessarily need to be in a strictly concurrent manner. According to the present disclosure, "simultaneous" capture includes, for example, (i) capture by a plurality of cameras at the same time, (ii) capture by a plurality of cameras in response to the same signal, and (iii) simultaneous capture by a plurality of cameras based on their respective internal clocks. A reference capture time includes a capture start time, a capture end time, a time at which captured image data is transmitted, and a time at which the image data is received by a destination apparatus. The stereo camera may be configured with a plurality of cameras accommodated in a housing. The stereo camera may be an apparatus that includes two or more cameras that are independent of one another and positioned remote from one another. The stereo camera is not limited to a plurality of cameras independent of one another. According to the present disclosure, the stereo camera may be, for example, a camera having an optical system configured to guide the light incident from two distant points to one light receiving element. In the stereo camera apparatus 10, the first camera 11a and the second camera 11b are arranged independently from each other. According to the present disclosure, a plurality of images capturing the same subject from different viewpoints may be referred to as "stereo images".

The first camera 11a and the second camera 11b each include an image sensor. The image sensor may be a CCD image sensor (a Charge-Coupled Device Image Sensor) or a CMOS image sensor (Complementary MOS Image Sensor). The first camera 11a and the second camera 11b may include respective lens mechanisms.

Optical axes of the first camera 11a and the second camera 11b are directed to be able to capture the same subject. The first camera 11a and the second camera 11b have different optical axes. The optical axes and positions of the first camera 11a and the second camera 11b are determined in such a manner that captured images include at least the same subject. The optical axes of the first camera 11a and the second camera 11b are directed to be parallel to each other. Here, "parallel" is not limited to exactly parallel but may allow for misalignment caused in assembly, displacement caused in attachment, and the misalignment and the displacement arising over time. The optical axes of the first camera 11a and second camera 11b do not need to be parallel to each other but may be directed to different directions. The first camera 11a and second camera 11b have respective imaging target regions partially overlapping with each other.

The first camera 11a and the second camera 11b are fixed to a body of the vehicle 1 in such a manner as to reduce changes in their positions and orientations with respect to the vehicle 1. Although being fixed, the first camera 11a and the second camera 11b may change positions or orientations with respect to the vehicle 1 in some situations. The optical axes of the first camera 11a and the second camera 11b are inclined to the road surface 13 from the Z direction. The optical axes of the first camera 11a and the second camera 11b may be directed in the Z direction or upward from the Z direction. The directions of the optical axes of the first camera 11a and the second camera 11b are appropriately adjusted in accordance with usage.

The first camera 11a and second camera 11b are arranged side by side and spaced apart from each other in the width direction of the vehicle (in the X direction). A distance between an optical center of the first camera 11a and an optical center of the second camera 11b is referred to as a baseline length, and a direction of the baseline length is referred to as a baseline direction. Thus, according to the present embodiment the baseline direction corresponds to the X direction.

The first camera 11a and the second camera 11b are positioned being spaced apart from each other in such a manner that their optical axes cross each other. According to the present embodiment, the first camera 11a and the second camera 11b are positioned along the width direction (the X direction) of the vehicle 1. The first camera 11a is facing forward and positioned on the right side of the second camera 11b, and the second camera 11b is facing forward and positioned on the left side of the first camera 11a. Due to the positional difference between the first camera 11a and the second camera 11b, the subject appears at different positions in the two images captured by the first camera 11a and the second camera 11b. The images output from the first camera 11a and the second camera 11b are stereo images captured from different viewpoints.

In one embodiment, the optical axes of the first camera 11a and the second camera 11b are fixed in a front part of the vehicle 1 and directed in the forward direction (the Z direction) of the vehicle 1. According to the present embodiment, the first camera 11a and the second camera 11b are capable of capturing outside the vehicle 1 through a windshield of the vehicle 1. In some embodiments, the first camera 11a and the second camera 11b may be fixed to a front bumper, a fender grill, a side fender, a light module, or a hood. The first camera 11a and the second camera 11b are not limited to the above positions but, according to another embodiment, may be positioned along an up-down direction (the Y direction) or a vertical direction within an XY plane. In this case, the images output from the first camera 11a and the second camera 11b are stereo images having a parallax in the up-down direction or in the vertical direction.

The first camera 11a and the second camera 11b each output their respective captured images as digital data to the parallax calculation apparatus 12. The parallax calculation apparatus 12 may perform various processing on the images output from the first camera 11a and the second camera 11b. The parallax calculation apparatus 12 calculates a distance to an object detected from the images output from the first camera 11a and the second camera 11b. The parallax calculation apparatus 12 may calculate the distance to the object by employing known techniques including the principle of triangulation. The distance acquired by the parallax calculation apparatus 12 is utilized, together with, as necessary, distance information acquired from sensors such as a laser radar and a millimeter wave radar, for a drive assist system which includes warnings to the driver for collision avoidance, automatic brake control, and acceleration and brake control for automatic cruise control.

Hereinafter, an x-direction and a y-direction in the image space of the images output from the first camera 11b and the second camera 11b correspond respectively to the X direction and the Y direction in a three-dimensional coordinate space.

Figure 2A:
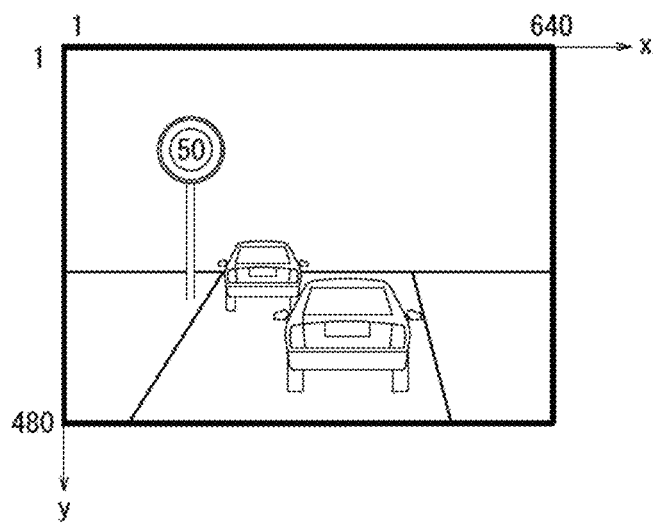
Figure 2B:
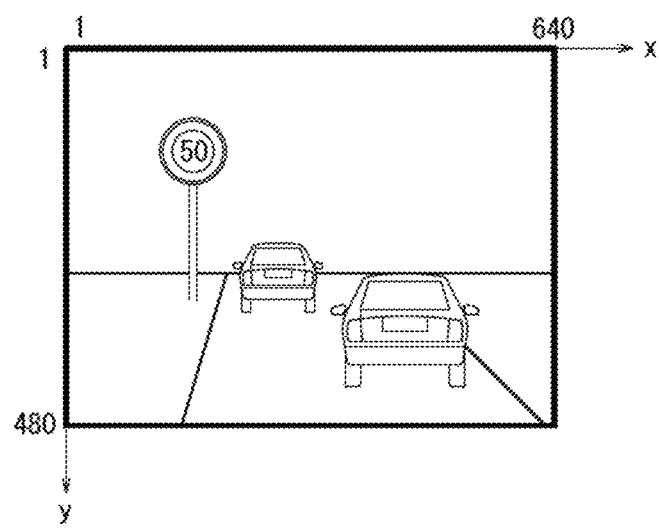

According to the present embodiment, the image captured by the first camera 11a as illustrated in FIG. 2A is set as a standard image, and the image captured by the second camera 11b as illustrated in FIG. 2B is set as a reference image. Hereinafter, a position of a pixel in the standard image and the reference image is represented by a coordinate with the upper left corner of each image set as the origin. Although the number of pixels in the x-direction is 640 and the number of pixels in the y-direction is 480, a different number of pixels in the x-direction and in the y-direction may be used. The number of pixels is determined by hardware and software of the stereo camera 11.

The parallax calculation apparatus 12 calculates a parallax of the standard image with respect to the reference image. The first camera 11a and the second camera 11b may have the same specification. The parallax calculation apparatus 12 may be configured such that the second camera 11b captures the standard image and the first camera 11a captures the reference image.

The first camera 11a and the second camera 11b output the captured images as digital data to the parallax calculation apparatus 12 mounted in the vehicle 1 as illustrated in FIG. 1. The parallax calculation apparatus 12 is capable of transmitting and receiving information with other information processing apparatuses, such as a display apparatus and a vehicle control apparatus, via a network such as CAN (Controller Area Network).

Figure 3:
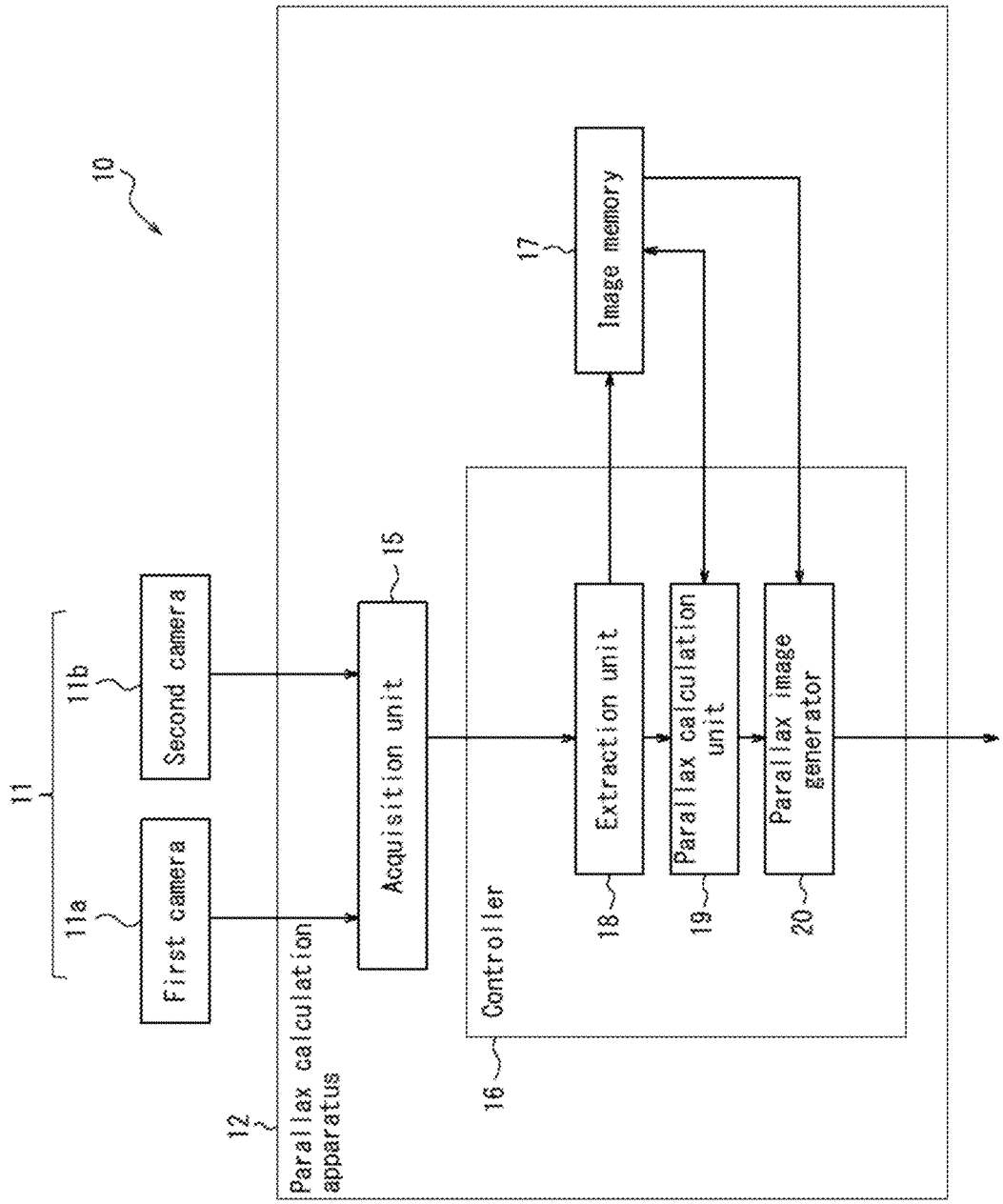
FIG. 3 is a block diagram schematically illustrating a configuration of an example of the stereo camera apparatus according to an embodiment.

FIG. 3 is a block diagram schematically illustrating a configuration of the stereo camera apparatus 10 according to the present embodiment. As mentioned above, the stereo camera apparatus 10 includes the stereo camera 11 and the parallax calculation apparatus 12. The parallax calculation apparatus 12 includes an acquisition unit 15, a controller 16, and an image memory 17.

The acquisition unit 15 functions as an input interface for acquiring the image data and inputting the image data to the parallax calculation apparatus 12. The acquisition unit 15 may be configured with a physical connector and a wireless communication device. The physical connector may be an electric connector for transmission of an electric signal, an optical connector for transmission of an optical signal, or a solenoid connector for transmission of electromagnetic waves. The electrical connector includes connectors conforming to IEC 60603, connectors conforming to the USB standard, connectors which support an RCA terminal, connectors which support an S-terminal as defined in EIAJ CP-1211A, connectors which support the D-terminal as defined in EIAJ RC-5237, connectors conforming to the HDMI® (HDMI is a registered trademark in Japan, other countries, or both) standard, and connectors corresponding to a coaxial cable including BNC. The optical connector includes a variety of connectors conforming to IEC 61754. The wireless communication device includes ones conforming to various standards, such as Bluetooth® (Bluetooth is a registered trademark in Japan, other countries, or both) and IEEE 802.11. The wireless communication device is provided with at least one antenna.

The acquisition unit 15 supports a transmission scheme of the image signal of the stereo camera 11 and acquires the image data of the standard image and the image data of the reference image from the first camera 11a and second camera 11b, respectively. According to the present disclosure, the standard image and the reference image may be collectively referred to as an "image", without distinction therebetween. According to the present disclosure, the image data of the standard image and the image data of the reference image may be collectively referred to as "image data", without distinction therebetween. The acquisition unit 15 passes an acquired image to the controller 16. The acquisition unit 15 acquires the image through signal input in a wired or wireless manner. The acquisition unit 15 may correspond to the transmission scheme of the image signal of the stereo camera 11.

The controller 16 is a constituent element of the parallax calculation apparatus 12 configured to perform various calculation processing. The controller 16 includes one or more processors. The controller 16 or the processor may include one or more memories for storing programs for various processing and information generated during the calculation processing. The memory may include volatile memory and nonvolatile memory. The memory may be a memory which is independent of the processor, or an internal memory of the processor. The processor may be a general-purpose processor for reading a particular program and executing a particular function, or a specialized processor dedicated to specific processing. The specialized processor includes an ASIC (Application specific Integrated Circuit) for specific usage. The processor includes a PLD (Programmable Logic Device). The PLD includes an FPGA (Field-Programmable Gate Array). The controller 16 may be either a SoC (System-on-a-Chip) in which one or more processors cooperate with one another, or a SiP (System In a Package).

Next, constituent elements of the controller 16 according to the present embodiment will be described. According to the present embodiment, the controller 16 includes an extraction unit 18, a parallax calculation unit 19, and a parallax image generator 20. The extraction unit 18, the parallax calculation unit 19, and the parallax image generator 20 may each be a hardware module or a software module. The controller 16 may perform operations of the extraction unit 18, the parallax calculation unit 19, and the parallax image generator 20. The controller 16 does not need to include the extraction unit 18, the parallax calculation unit 19, and the parallax image generator 20 but may omit one or more of them. According to the present embodiment, the controller 16 may implement the operations of all of the extraction unit 18, the parallax calculation unit 19, and the parallax image generator 20. The operations of the extraction unit 18, the parallax calculation unit 19, and the parallax image generator 20 may be referred to as operations performed by the controller 16. The controller 16 itself may implement the processing the controller 16 performs by utilizing the extraction unit 18, the parallax calculation unit 19, or the parallax image generator 20.

The extraction unit 18 processes both the standard image and the reference image acquired by the acquisition unit 15. In the image data of the standard image and the image data of the reference image, the x-direction of the image space corresponds to the baseline direction of the three-dimensional coordinate space. The x-direction may be referred to as a first direction. The baseline direction may be referred to as the x-direction. The y-direction crosses the x-direction in the image space. In the image data, a plurality of pixels are arranged in the x-direction. According to the present disclosure, a plurality of pixels arranged in the x-direction may be referred to as a line. In the image data, a plurality of lines are arranged in the y-direction. The extraction unit 18 extracts lines from the plurality of lines. The extraction unit 18 may extract lines from the plurality of lines at predetermined intervals. The extraction by the extraction unit 18 may include periodicity. According to the present disclosure, the period of the extraction may be referred to as a repetition period. The extraction unit 18 generates an extracted image of the standard image and an extracted image of the reference image by rearranging extracted lines based on their locations in images of extraction sources. According to the present disclosure, the extracted image of the standard image and the extracted image of the reference image may be simply referred to as an "extracted image", without distinction therebetween. The extracted image of the standard image may be referred to as an "extracted standard image". The extracted image of the reference image may be referred to as an "extracted reference image". A "thinned-out image" may be referred to as the "extracted image". The repetition period may be regular or irregular. The extraction unit 18 extracts the lines at intervals and thus reduces the number of pixels to be subjected to the processing. Hereinafter, an example of extracting the lines at intervals will be described.

The extraction unit 18 may set a pitch $P_y$ ($P_y$ is a natural number) as a predetermined interval. The extraction unit 18 may use a pitch $P_y$ set by another element. The extraction unit 18 extracts a plurality of lines from the image according to the pitch $P_y$ in the y-direction. In the example illustrated in FIGS. 4A and 4B, lines that are not extracted are represented by black lines. The extraction unit 18 generates the extracted images as illustrated in FIGS. 5A and 5B by rearranging the extracted lines without gaps therebetween in the order of the coordinates thereof in the images of the extraction sources.

The pitch $P_y$ represents the interval for extraction of the pixels in the y-direction. The pitch $P_y$ may be represented in pixel units. When the pitch $P_y$=n is satisfied, the extraction unit 18 extracts one line per n-pixels in the y-direction. In the example illustrated in FIGS. 4A, 4B, 5A, and 5B, $P_y$=2 is satisfied. When the pitch $P_y$=2 is satisfied, the extraction unit 18 extracts one pixel per two pixels in the y-direction. For a subject located at a short distance captured by the stereo camera 11 mounted on the vehicle, the size of one pixel approximately corresponds to the size of a small stone in the three-dimensional coordinate space. Sizes approximately corresponding to the size of a small stone do not affect detection of obstacles. For a subject located at a long distance, the size of one pixel approximately corresponds to the size of an object or a person of approximately 800 mm in the three-dimensional coordinate space. If the object or person is located at a long distance at which it does not qualify as a detection target for obstacles, it will not affect obstacle detection and the like. The pitch $P_y$ is not limited to $P_y$=2 but may be set to any appropriate value in accordance with the usage, etc.

Next, an extracted image generation method of the extraction unit 18 will be described in detail.

Figure 4A:
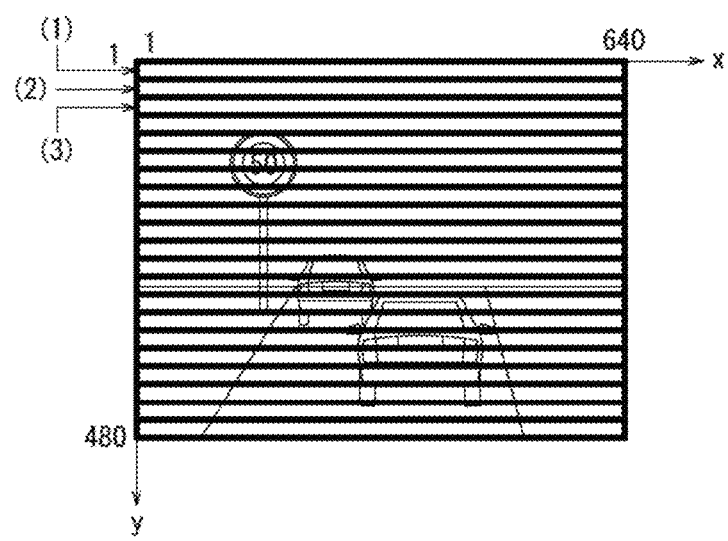
Figure 4B:
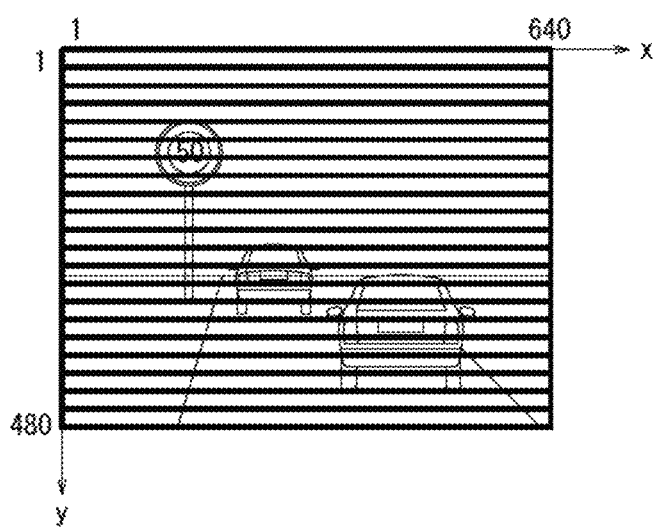
Figure 5A:
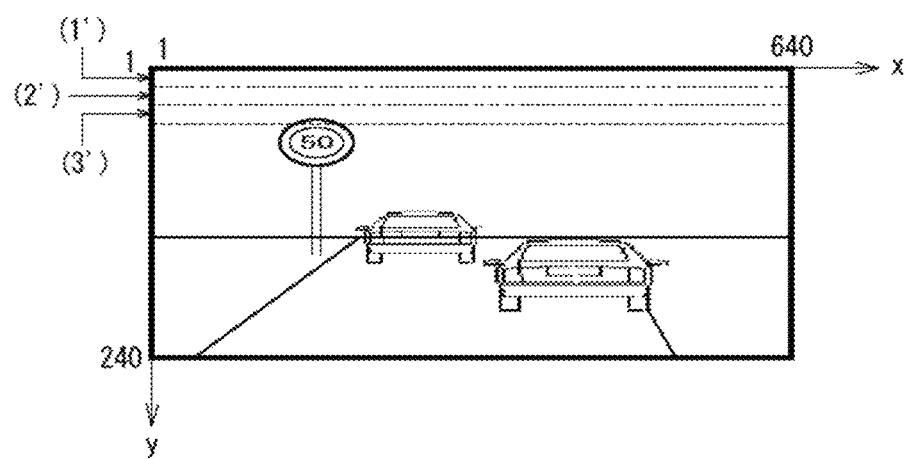
Figure 5B:
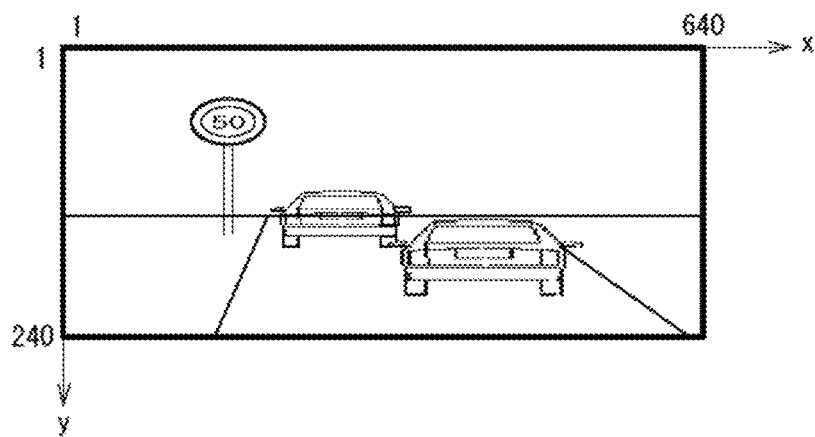

The extraction unit 18 extracts pixels at coordinates (k, 1×$P_y$), i.e., the line represented by (1) in the image illustrated in FIG. 4A by way of example from the image acquired by the acquisition unit 15. An association between luminance values L(k, 1) and the corresponding pixels (k, 1) of the extracted image, i.e., the line represented by (1') in the extracted image illustrated in FIG. 5A is stored in the image memory 17. Here, k=1 to $x_{max}$. The $x_{max}$ is the number of pixels in the x direction in the image, i.e., a maximum value of an x-coordinate. In the example illustrated in FIGS. 2A and 2B, $x_{max}$=640.

Next, the extraction unit 18 extracts pixels at y=2×$P_y$, obtained by adding the pitch $P_y$ to a y-coordinate of a pixel group subjected to the previous processing, from the image acquired by the acquisition unit 15. That is, the extraction unit 18 extracts pixels at coordinates (k, 2×$P_y$), i.e., the line indicated by (2) in the image illustrated in FIG. 4A by way of example The extraction unit 18 stores an association between luminance values L(k, 2) and the corresponding pixels (k, 2) of the extracted image, i.e., the line represented by (2') in the extracted image illustrated in FIG. 5A by way of example, in the image memory 17. Similarly, the extraction unit 18 extracts pixels of y=3×$P_y$, obtained by adding the pitch $P_y$ to the y-coordinate subjected to the previous processing, from the image acquired by the acquisition unit 15. That is, the extraction unit 18 extracts pixels at the coordinate (k, 3×$P_y$), i.e., the line indicated by (3) in the image illustrated in FIG. 4A by way of example. The extraction unit 18 stores an association between luminance values L(k, 3) of these pixels at the coordinates (k, 3×P$_y$) and the corresponding coordinates (k, 3) of the extracted image, i.e., the line represented by (3') in the extracted image illustrated in FIG. 5A by way of example, in the image memory 17.

Similarly, the extraction unit 18 sequentially extracts the pixels at the coordinates (k, n×P$_y$, where n is a natural number) of the image acquired by the acquisition unit 15, and stores an association between the luminance values L(k, n) of the pixels and the corresponding coordinates (k, n) of the extracted image in the image memory 17.

This operation is repeated while the coordinate n×P$_y$ of the y-coordinate of the pixel extracted by the extraction unit 18 does not exceed the maximum value y$_{max}$ (y$_{max}$=479 in the example illustrated in FIGS. 2A and 2B) of the y-coordinate of the image acquired by the acquisition unit 15. Thus, the extraction unit 18 generates the extracted standard image illustrated in FIG. 5A from the standard image illustrated in FIG. 2A. The extraction unit 18 generates the extracted reference image illustrated in FIG. 5B from the reference image illustrated in FIG. 2B.

The parallax calculation unit 19 calculates the parallax between the extracted standard image and the extracted reference image subjected to the processing by the extraction unit 18. The parallax calculation unit 19 divides one of the extracted standard image and the extracted reference image into a plurality of regions. The parallax calculation unit 19 matches each of the plurality of regions to the other of the extracted standard image and the extracted reference image. The parallax calculation unit 19 calculates a distance for these regions based on a difference in coordinates in the left-right direction of two matched regions of the extracted standard image and the extracted reference image. The parallax calculation unit 19 identifies an object in the position by detecting a group of regions having the same distance. The parallax calculation unit 19 determines a distance to the identified object by using the distance of the region having the identified object. The object identified by the parallax calculation unit 19 includes an obstacle. The obstacle includes at least one of a human, a vehicle, a road sign, a building, and vegetation. According to an embodiment, the parallax calculation unit 19 associates the identified object with a distance image. The parallax calculation unit 19 outputs information that includes at least one of the distance image, the identified object, and the distance to the identified object. According to the present embodiment, the parallax calculation unit 19 performs the processing on real-time basis.

From the extracted standard image, the parallax calculation unit 19 extracts a first block that includes a pixel (a pixel of interest) in the extracted standard image and a plurality of pixels surrounding the pixel of interest. The parallax calculation unit 19 extracts the first block from a plurality of consecutive lines. From the extracted reference image, the parallax calculation unit 19 extracts a plurality of second blocks matched to the first block extracted from the extracted standard image. The parallax calculation unit 19 extracts the second block from a plurality of consecutive lines. The plurality of lines from which the second block is extracted have the same y-coordinates as the plurality of lines from which the first block is extracted. For each block, the parallax calculation unit 19 performs one-dimensional matching between the first block and a plurality of second blocks. The parallax calculation unit 19 sequentially performs the one-dimensional matching by sequentially shifting the second block to be subjected to the one-dimensional matching to the first block in the baseline direction. The parallax calculation unit 19 performs the one-dimensional matching between the extracted standard image and the extracted reference image at a high speed based on the luminance value of each pixel extracted from the extracted standard image and the extracted reference image. For such speedy operation, the parallax calculation unit 19 may include a parallel processing operation circuit specialized for stereo image processing.

Figure 6A:
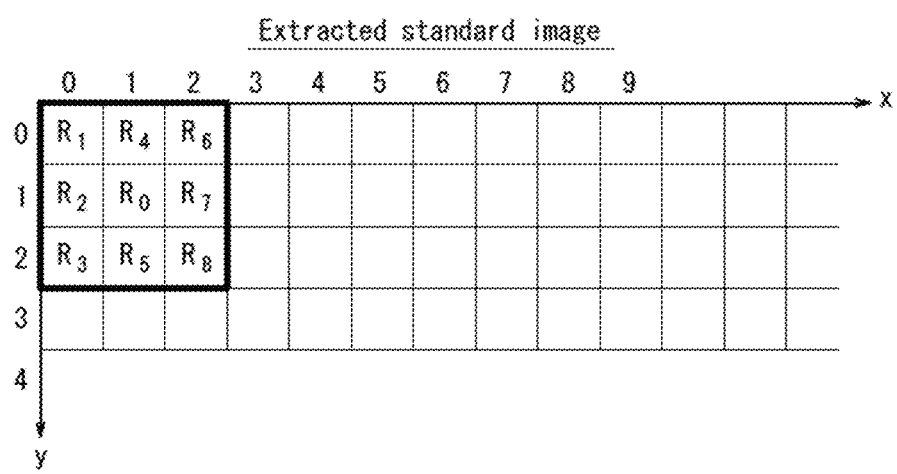
FIGS. 6A and 6B are diagrams illustrating matching of a block of the extracted standard image to the extracted reference image.
Figure 6B:
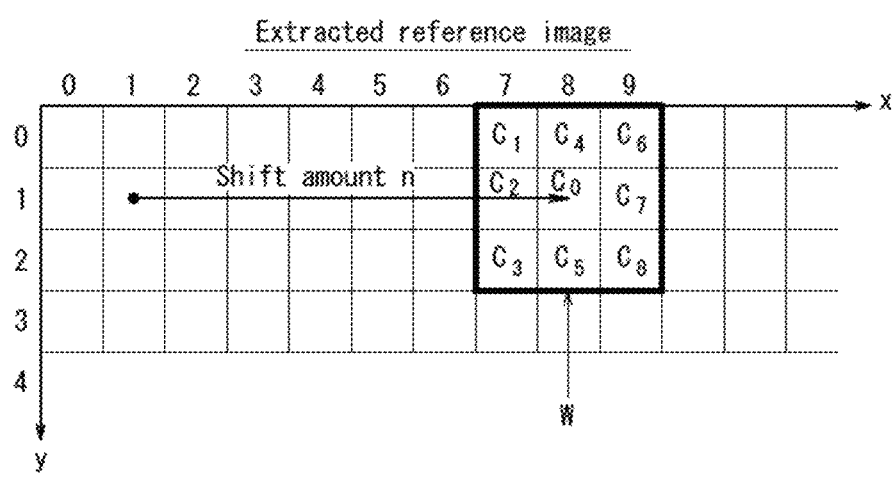

Here, a parallax calculation method of the parallax calculation unit 19 will be described in detail with reference to FIGS. 6A and 6B. FIG. 6A is a conceptual diagram illustrating an enlarged portion of the extracted standard image, in which one cell represents one pixel, e.g., R0 represents the pixel at the coordinate (1, 1) and R7 represents the pixel at the coordinate (2, 1). Similarly, FIG. 6B is a conceptual diagram illustrating an enlarged portion of the extracted reference image, in which one cell represents one pixel, e.g., C0 represents the pixel at the coordinate (8, 1) and C7 represents the pixel at the coordinate (9, 1).

In particular, the parallax calculation unit 19 extracts a rectangular block of 3-by-3 pixels for each pixel (the pixel of interest) of the extracted reference image generated by the extraction unit 18. The rectangular block of 3-by-3 pixels is made up of the pixel of interest (R0 of FIG. 6A) and pixels (R1 to R8 of FIG. 6A) adjacent to the pixel of interest as illustrated in FIG. 6A. Next, the parallax calculation unit 19 acquires image data of three lines (the lines 0 to 2 of FIG. 6B) of the extracted reference image corresponding to the lines of the extracted block in the baseline direction. Then, the parallax calculation unit 19 performs the one-dimensional matching to the extracted reference image by shifting the block of the extracted reference image by one pixel from the left side in the baseline direction.

The extraction of the block may be targeted to the entire extracted image. However, when the parallaxes of the upper region and the lower region of the extracted image are not calculated, the extraction of the block is targeted to a region of the extracted image excluding the regions for which the parallaxes are not calculated. Also, the block is not limited to the pixel of interest (R0) and the pixels (R1 to R8) surrounding the pixel of interest. For example, the block may be a rectangular block of 5-by-5 pixels made up of the pixel of interest (R0), the pixels (R1 to R8) surrounding the pixel of interest, and the pixels surrounding the pixels R1 to R8. Similarly, the block may be 9-by-9 pixels. When the block is too small, the parallax may not be accurately calculated due to insufficient information used for the calculation of the parallax. When the block is too large, on the other hand, the block is likely to include subjects with different parallaxes. The size of the block may range from, but not limited to, 3-by-3 pixels to less than 10-by-10 pixels.

The parallax image generator 20 generates an extracted parallax image in which the parallax calculated by the parallax calculation unit 19 is indicated at a position of the pixel associated with the parallax in the extracted image.

Figure 7:
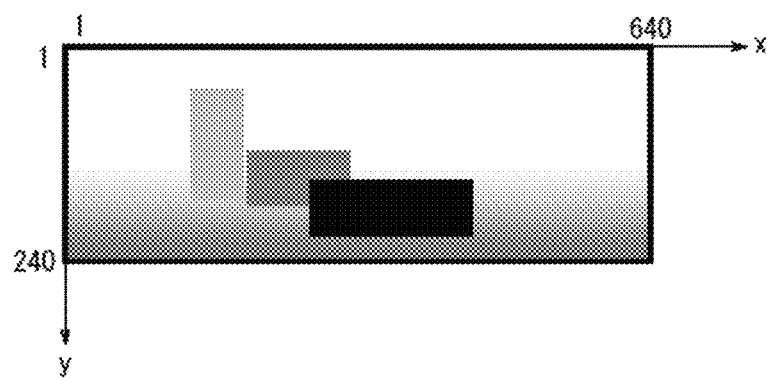
FIG. 7 is a diagram illustrating an example of an extracted parallax image generated by a parallax image generator.

In the example of the extracted parallax image illustrated in FIG. 7, the pixel with a greater parallax, i.e., the pixel including the subject closer to the stereo camera is provided with a lower luminance value. Or, in the extracted parallax image, the pixel including the subject closer to the stereo camera may have a higher luminance value. The extracted parallax image may include distance information in the form of a color scale. In the extracted parallax image, for example, a pixel that includes a close subject may be colored a darker shade of blue. Also, a pixel that includes a distant subject may be colored a darker shade of red.

Figure 8:
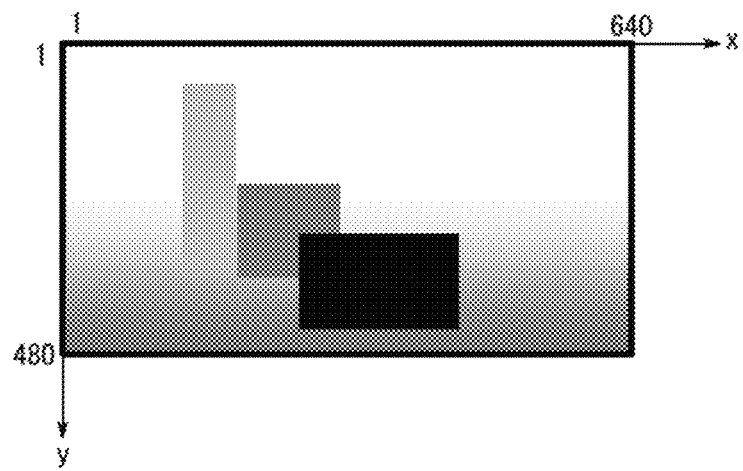
FIG. 8 is a diagram illustrating an example of an interpolated parallax image generated by interpolation of the extracted parallax image performed by an interpolation unit.

Also, the parallax image generator 20 performs interpolation for generating an interpolated parallax image as illustrated in FIG. 8 in a size similar to the image acquired by the acquisition unit 15 based on the extracted parallax image. In particular, the parallax image generator 20 places the parallax calculated by the parallax calculation unit 19 to a position in the interpolated parallax image corresponding to a position in the standard image of the extraction source of the pixels associated with the parallax. The parallax image generator 20 interpolates the parallax to a position of a pixel of which parallax is not calculated, by using the parallax of the pixel adjacent thereto in the y-direction calculated by the parallax calculation unit 19.

The standard image captured by the camera 11a and the reference image captured by the camera 11b acquired by the acquisition unit 15 as illustrated in FIG. 2A and FIG. 2B, respectively, by way of example each have 640×480 pixels. However, the extracted standard image and the extracted reference image generated based on the standard image and the reference image, respectively, each have 640×240 pixels as illustrated in FIGS. 5A and 5B. As illustrated in FIG. 7, thus, the extracted parallax image is smaller than the image captured by the stereo camera 11. A user using the parallax image desires that the parallax image be the same size as the original image. Also, for the vehicle control apparatus configured to control the vehicle based on the parallax image, it is preferable that the parallax image be in the same size as the original image, in order to synthesize an image by superimposing the parallax image on the captured image and perform image processing, such as obstacle detection. Using the parallax image having the same amount of information as the original image enables more accurate control than using the extracted parallax image with a smaller amount of information.

Here, with reference to FIG. 9, an example of the interpolation performed by the parallax image generator 20 to generate the interpolated parallax image from the extracted parallax image will be described. FIG. 9A illustrates a conceptual diagram of the extracted parallax image, in which d(1,1) to d(640,240) represent parallax d of the pixels of the coordinates (1, 1) to (640, 240).

The parallax image generator 20 extracts the parallax of pixels of each line, i.e., the coordinates (k, n) from the extracted parallax image. Here, k=1 to $x_{max}$, where $x_{max}$ represents the number of pixels in the x-direction of the extracted parallax image, e.g., a maximum value of the x-coordinate. Also, n=1 to $y'_{max}$, where $y'_{max}$ represents the number of pixels in the y-direction of the extracted parallax image, e.g., a maximum value of the y-coordinate. In the example illustrated in FIGS. 9A and 9B, $x_{max}$=640 and $y'_{max}$=240.

Then, the parallax image generator 20 stores an association between a parallax d(k, n) at the coordinate (k, n) and the coordinate (k, n×$P_y$) in the image memory 17. Here, $P_y$ is at the same value as the pitch $P_y$ used for an extracted image generation process.

Figures 9A, 9B:
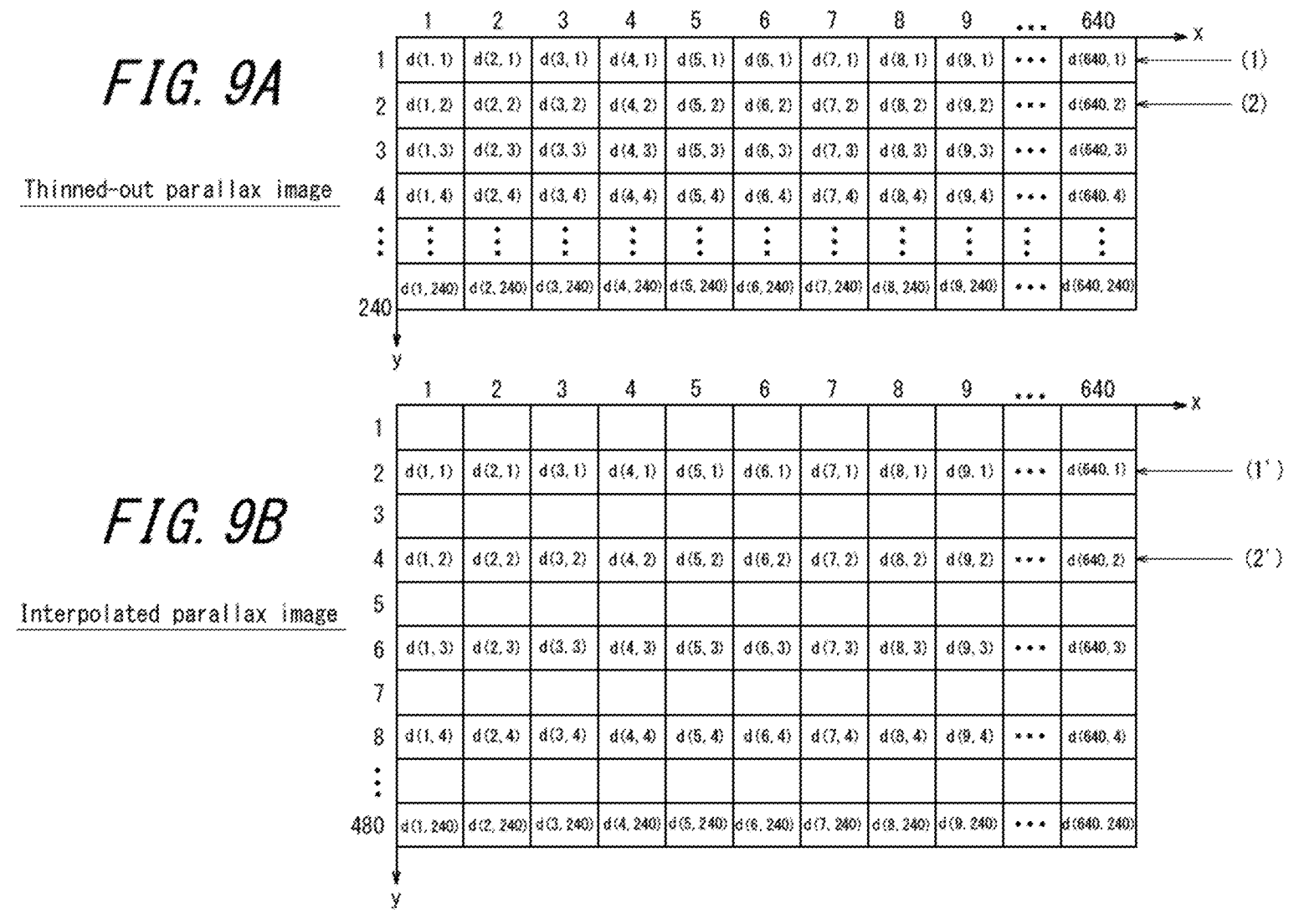

Next, the parallax image generator 20 interpolates the parallaxes d to positions corresponding to pixels included in lines which were not extracted by the extraction unit 18 and for which the parallax were not calculated by the parallax calculation unit 19, that is, to blank boxes in the interpolated parallax image as illustrated in FIG. 9B by way of example. That is, the parallax image generator 20 interpolates the parallax d to positions between the coordinate (k, n×$P_y$) and the coordinate (k, (n+1)×$P_y$). To that end, the parallax image generator 20 interpolates a mean value of a parallax at a position of a first pixel and a parallax at a position of a second pixel to the positions between the coordinate (k, n×$P_y$) and the coordinate (k, (n+1)×$P_y$). The position of the first pixel is the position of a pixel for which parallax has been calculated and which is adjacent, on one side in the y-direction, to a position for which parallax has not been calculated. The position of the second pixel is the position of a pixel for which parallax has been calculated and which is adjacent, on the other side in the y-direction, to a position for which the parallax has not been calculated.

Thus, the parallax image generator 20 stores an association between the coordinates between the coordinate (k, n×$P_y$) and the coordinate (k, (n+1)×$P_y$) in the interpolated parallax image and the mean value of the parallaxes of the pixels at these coordinates. The mean value of the parallax d(k, n) and the parallax d(k, n+1) is represented by (d(k, n)+d(k, n+1))/2.

A specific example of the above process will be described with reference to FIGS. 9A and 9B. The pitch $P_y$ is the same as the pitch $P_y$ of the extraction process, and thus, as with the extraction process described above, $P_y$=2 is used here.

The parallax image generator 20 extracts the parallaxes d(1, 1) to d(640, 1) of the coordinates (1, 1) to (640, 1), respectively, from the extracted parallax image illustrated in FIG. 9A (see the line (1) in FIG. 9A). The parallax image generator 20 stores, in the image memory 17, an association between the parallaxes d(1, 1) to d(640, 1) and the coordinates (1, 2) to (640, 2), respectively, of the interpolated parallax image as illustrated in FIG. 9B (see the line (1') in FIG. 9B).

Similarly, the parallax image generator 20 extracts the parallaxes d(1, 2) to d(640, 2) of the coordinates (1, 2) to (640, 2), respectively, from the extracted parallax image (see the line (2) of FIG. 9A). Then, the parallax image generator 20 stores, in the image memory 17, an association between the parallaxes d(1, 2) to d(640, 2) and the coordinates (1, 4) to (640, 4), respectively, of the interpolated parallax image as illustrated in FIG. 9B (see the line (2') of FIG. 9B).

Then, the parallax image generator 20 interpolates the mean value (d(1,2)+d(1,4))/2 of the parallax d(1, 2) and the parallax d(1, 4) to the coordinate (1, 3) of which the parallax is not calculated. The parallax d(1, 2) is a parallax of a pixel at the coordinate (1, 2) adjacent to the coordinate (1, 3) on one side in the y-direction. The parallax d(1, 4) is a parallax of a pixel at the coordinate (1, 2) adjacent to the coordinate (1, 3) on the other side in the y-direction. The parallaxes are interpolated to other coordinates in the same manner.

In this way, the parallax image generator 20 may sequentially interpolate to the coordinates (k, 2×n+1, where k=1 to 640 and n=1 to 239) in the interpolated parallax image of which the parallax is not calculated. Note that each of the coordinates (k, 1) in the interpolated parallax image of which the parallax is not calculated may be interpolated with the parallax d(k, 1), i.e., the same parallax as that of the coordinate (k, 2) in the interpolated parallax image. Thus, an association between all coordinates in the interpolated parallax image and their respective parallaxes is stored, and the interpolated parallax image is generated.

The parallax image generator 20 transmits the parallax image generated by the parallax image generator 20 to the vehicle control apparatus and outputs the parallax image to the display apparatus for displaying the parallax image.

The image memory 17 is a memory for provisionally storing the image that is acquired by the acquisition unit 15 and subjected to the extraction process by the controller 16. The image memory 17 may be a high-speed volatile memory such as a DRAM (Dynamic Random Access Memory) or an SDRAM (Synchronous Dynamic Random Access Memory).

During the image processing, the image memory 17 stores the image as well as the parallax of each pixel calculated by the parallax calculation unit 19.

Figure 10:
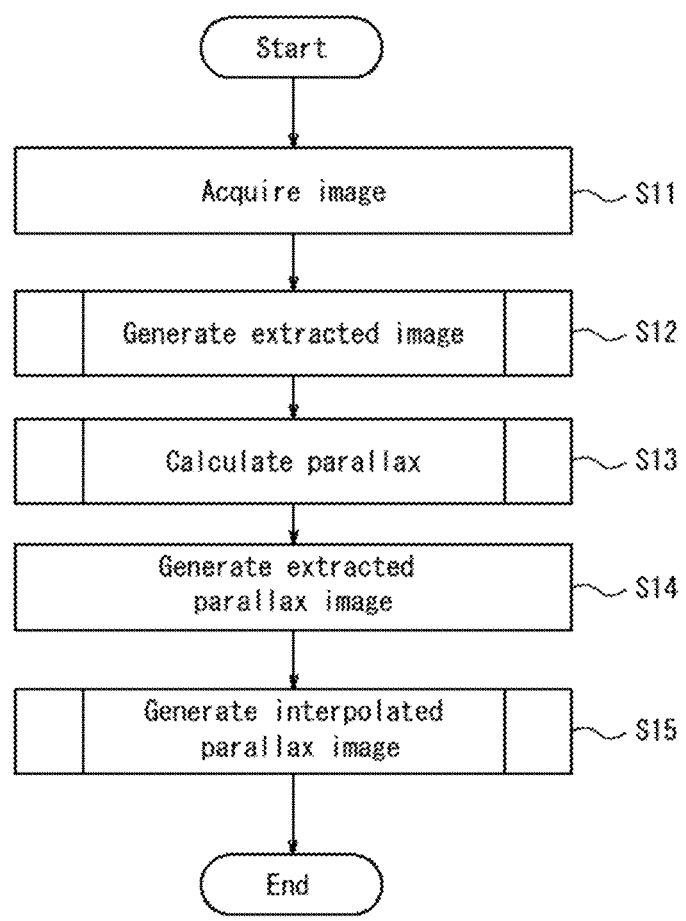
FIG. 10 is a flowchart illustrating a parallax image generation process performed by a parallax calculation apparatus.

The following is a description of the parallax calculation method of the parallax calculation apparatus 12 with reference to the flowchart of FIG. 10.

First, the acquisition unit 15 acquires the images from the first camera 11a and the second camera 11b (step S11).

Next, the extraction unit 18 of the controller 16 generates the extracted images by extracting the pixels in the y-direction from the images acquired by the acquisition unit 15 (step S12).

Here, the extracted image generation process of the extraction unit 18 will be described with reference to the flowchart of FIG. 11.

Figure 11:
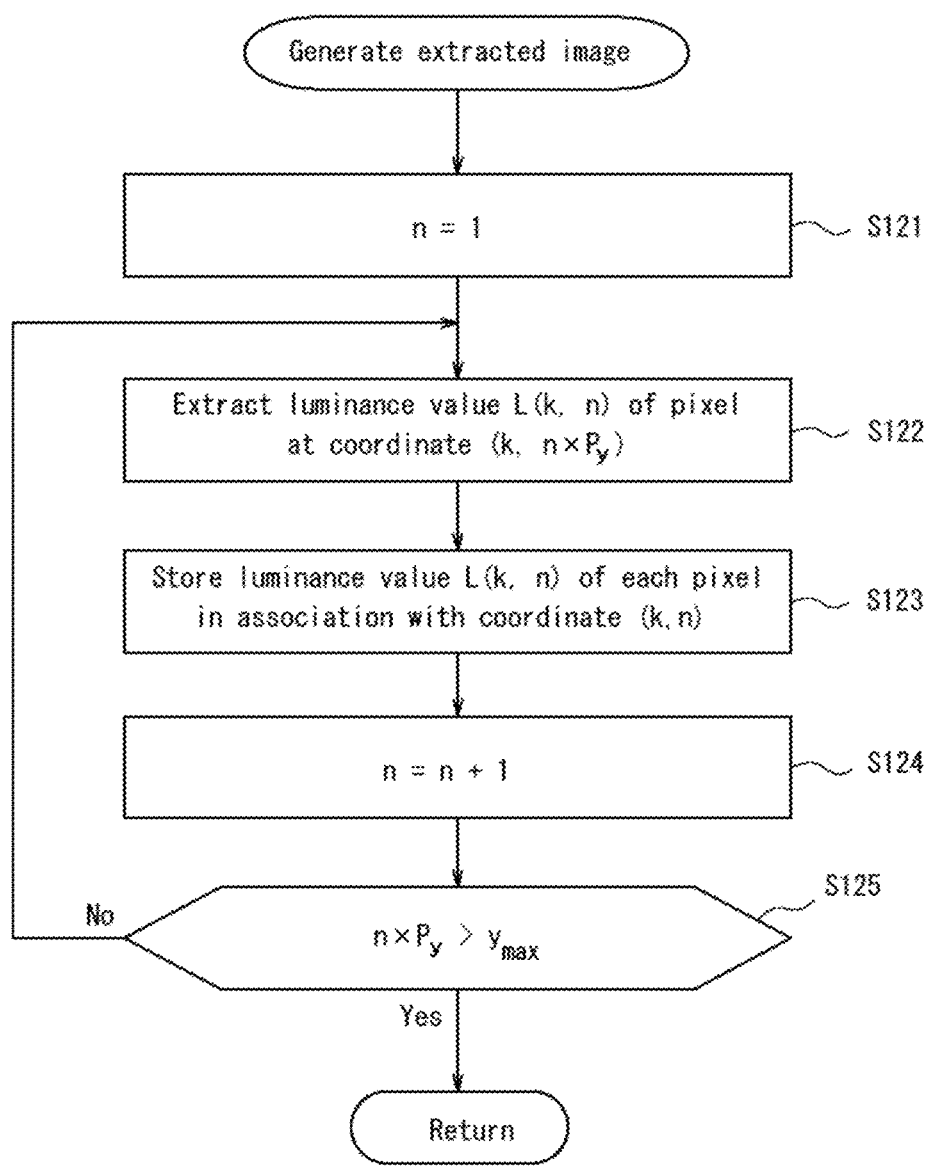
FIG. 11 is a flowchart illustrating detail of an extracted image generation process performed by the extraction unit.

As illustrated in FIG. 11, the extraction unit 18 sets n=1 (step S121). Then, the extraction unit 18 extracts the luminance values L(k, 1) of the pixels at the coordinates (k, n×$P_y$), i.e., the coordinates (k, 1×$P_y$) from the image for each k (k=1 to 640) based on the pitch $P_y$ (step S122). After extracting the luminance values L(k, 1) in step S122, the extraction unit 18 stores the association between the luminance values L(k, 1) and the coordinates (k, 1) in the image memory 17 (step S123).

After storing the association between the luminance values L(k, 1) and the coordinates (k, 1) in the image memory 17 in step S123, the extraction unit 18 sets n=2 by adding 1 to n (step S124) and then determines whether n×$P_y$>$y_{max}$ is satisfied (step S125). When it is determined that n×$P_y$>$y_{max}$ is not satisfied in step S125, the parallax calculation apparatus 12 returns to step S122. Then, the extraction unit 18 extracts the luminance values L(k, 2) of the pixel group at the coordinates (k, n×$P_y$), i.e., the coordinates (k, 2×$P_y$) from the image (step S122). After extracting the luminance values L(k, 2) in step S122, the extraction unit 18 stores the association between the luminance values L(k, 2) and the coordinates (k, 2) in the image memory 17 (step S123).

The procedures in step S122 to S125 as described above are repeated and, when it is determined that n×$P_y$>$y_{max}$ is satisfied in step S125, the extraction unit 18 ends the extraction process. Thus, the extracted image is generated within the image memory 17.

Referring back to FIG. 10, after the extraction unit 18 generates the extracted image in step S12, the parallax calculation unit 19 calculates the parallax of each pixel of the extracted standard image as one of the extracted images, by performing the one-dimensional matching to the extracted reference image.

Here, a parallax calculation process of the parallax calculation unit 19 will be described with reference to the flowchart of FIG. 12.

First, the parallax calculation unit 19 selects one pixel from the extracted standard image (step S130). For example, when the block is made up of 3-by-3 pixels, the parallax calculation unit 19 extracts a block that includes the pixel (R0 of FIG. 6A) selected in step S130 and a plurality of pixels (R1 to R8 of FIG. 6A) surrounding this pixel (step S131) from the image memory 17.

After extraction of the block in step S131, the parallax calculation unit 19 acquires, from the extracted reference image, the image data of three lines the same as those of the extracted block in the baseline direction (lines 0 to 2 of FIG. 6B). Then, the parallax calculation unit 19 shifts the block in the baseline direction by one pixel from the left side and performs the one-dimensional matching of the extracted standard image and the extracted reference image as described below.

First, the parallax calculation unit 19 sets a shift amount m corresponding to the selected block to 0 (step S132). Here, the shift amount m represents the number of pixels through which the block of the extracted standard image is shifted in the baseline direction, i.e., in the horizontal direction with respect to the locations of the pixels in the extracted reference image.

Next, the parallax calculation unit 19 calculates an evaluation value for the case in which the shift amount m is 0 and sets the evaluation value as a current minimum evaluation value (step S133). For the calculation of the evaluation value, a SAD (Sum of Absolute Difference) is used as an evaluation function. That is, the parallax calculation unit 19 calculates an absolute value of a difference in the luminance values of the block of the extracted standard image and the luminance values of the pixels of the extracted reference image associated with the block, and adds the absolute value to all the pixels in the block. The smaller the evaluation value, the higher a matching level between the block of the extracted reference image and the extracted standard image.

With reference to FIGS. 6A and 6B, the one-dimensional matching of the block of the extracted standard image to the extracted reference image will be further described. First, the block extracted from the extracted standard image includes 3 rows and 3 columns of pixels (R0 to R8). According to the present embodiment, as illustrated in FIG. 1, the first camera 11a positioned on the right side with respect to a direction directed to the subject outputs the standard image. The second camera 11b positioned on the left side with respect to the direction directed to the subject outputs the reference image. As illustrated in FIGS. 6A and 6B, therefore, the subject in the standard image locates further on the right side in the reference image. The parallax calculation unit 19 thus shifts, by one pixel at a time, a region of 3-by-3 pixels in the same size as the block in the extracted standard image in the right-side direction in the extracted reference image from the position corresponding to the block in the extracted reference image, extracts the block, and then calculates the evaluation function. The one-dimensional matching of the extracted standard image means shifting a window W in the same size as the block of the extracted standard image in the baseline direction in the extracted reference image. The one-dimensional matching of the extracted standard image means matching a luminance value of a pixel of the extracted reference image in the window W to a luminance value of the pixel of the block of the extracted standard image.

FIG. 6B illustrates the case in which the shift amount m is 7. In this case, when the 3-by-3 pixels within the window W is C0 to C8, the evaluation value SAD is calculated from the following equation:

$$SAD = \Sigma |R_i - C_i| \qquad (2),$$

where $R_i$ represents the luminance value of an i-th pixel of the block of the extracted standard image, and $C_i$ represents the luminance value of an i-th pixel in the window W of the extracted reference image. Σ means taking the summation of i=0 to 8.

Figure 12:
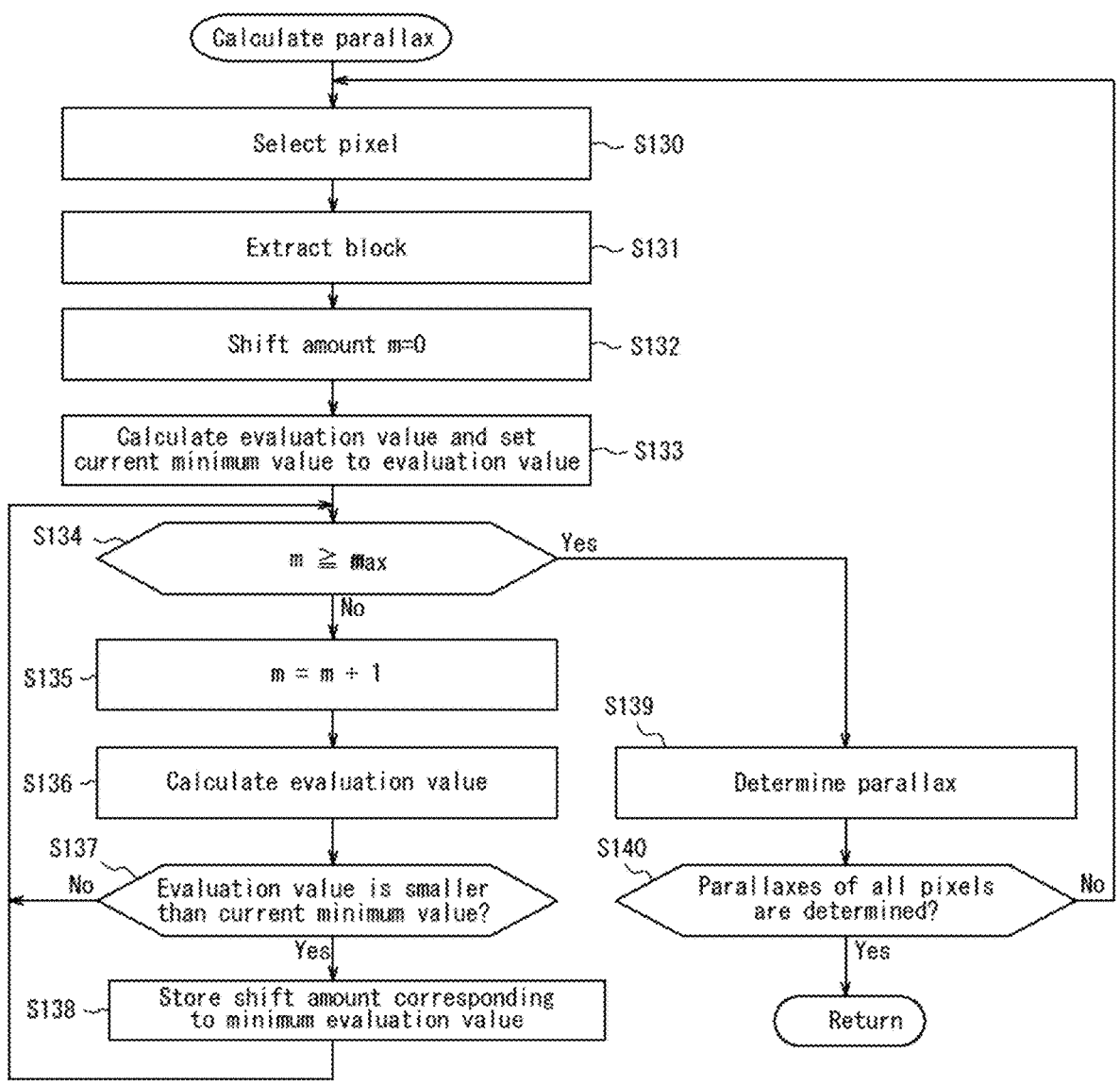
FIG. 12 is a flowchart illustrating detail of a parallax calculation process performed by a parallax calculation unit.

Referring back to the flowchart of FIG. 12, in the subsequent procedure the parallax calculation unit 19 sequentially increments the shift amount m by one pixel and repeats the calculation of the evaluation value.

Although according to the present embodiment the shift amount m is sequentially incremented by one pixel, the shift amount m may be incremented by any appropriate number of pixels. However, the number of pixels of the shift amount m may be no more than a width of the block in the baseline direction. According to the present embodiment, the block includes 3-by-3 pixels, and thus the shift amount m is three pixels at maximum. When the shift amount m is larger than three pixels, the likelihood that the minimum evaluation value is not correctly calculated is high.

The parallax calculation unit 19 increases the shift amount m by one pixel when $m \geq m_{max}$ is not satisfied (step S134). That is, the parallax calculation unit 19 shifts the block of the extracted standard image by one more pixel in the extracted reference image. Then, the parallax calculation unit 19 recalculates the evaluation value of the block of the extracted reference image and the extracted standard image after the shifting (step S136).

When the calculated evaluation value is smaller than a current minimum evaluation value (step S137), the parallax calculation unit 19 sets the minimum evaluation value to this evaluation value. Further, the parallax calculation unit 19 stores the shift amount m corresponding to the minimum evaluation value (step S138). When the evaluation value is larger than the current minimum evaluation value, the parallax calculation unit 19 returns to step S134 and repeats the procedures in steps S134 to S138 until $m \geq m_{max}$ is satisfied. Here, the $m_{max}$ is the maximum value for shifting the block of the reference image and corresponds to a minimum distance that can be calculated in the stereo image. The $m_{max}$ value may be set to, for example, approximately 50 to 100 pixels.

On the other hand, when is satisfied in step S134, the parallax calculation unit 19 sets the shift amount m corresponding to the minimum evaluation value as the parallax of the block (step S139). Then, the parallax calculation unit 19 returns to step S130 and repeats the calculation of the parallax d by sequentially selecting the pixels from the reference image until the parallaxes d of all pixels are calculated. When the parallax d of all pixels are determined (step S140), the parallax calculation process ends.

Referring back to FIG. 10, when the parallax is calculated in step S13, the parallax image generator 20 generates the extracted parallax image by storing the parallax d(x, y) of the coordinate (x, y) calculated by the parallax calculation unit 19 in the image memory 17 (step S14).

After generating the extracted parallax image in step S14, the parallax image generator 20 generates the interpolated parallax image based on the extracted parallax image stored in the image memory 17 (step S15).

Here, an interpolated parallax image generation process of the parallax image generator 20 will be described with reference to the flowchart of FIG. 13.

Figure 13:
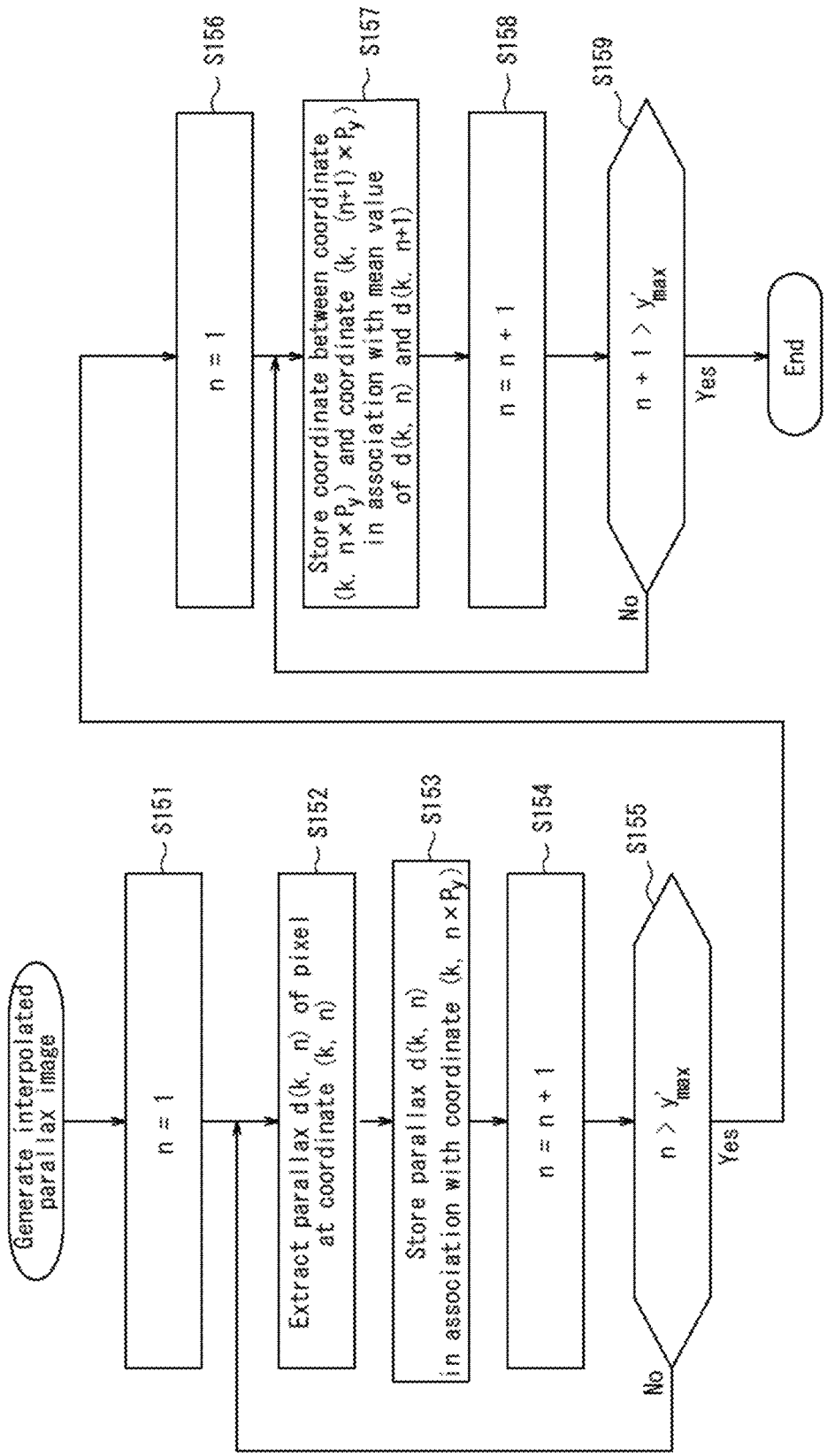
FIG. 13 is a flowchart illustrating detail of an interpolated parallax image generation process performed by a parallax image generator 20.

As illustrated in FIG. 13, the parallax image generator 20 sets n=1 (step S151). The parallax image generator 20 extracts the parallax d(k, 1) of the pixel at the coordinate (k, n), i.e., (k, 1) from the extracted parallax image stored in the image memory 17 (step S152). After extracting the parallax d(k, 1) in step S152, the parallax image generator 20 stores an association between the parallax d(k, 1) and the coordinate (k, n×$P_y$), i.e., the coordinate (k, 1×$P_y$) as the extracted interpolated image in the image memory 17 (step S153).

After storing the association between the parallax d(k, 1) and the coordinate (k, 1×$P_y$) in the image memory 17 in step S153, the parallax image generator 20 sets n=2 by adding 1 to n (step S154) and determines whether $n > y'_{max}$ is satisfied (step S155).

When determining that $n > y'_{max}$ is not satisfied in step S155, the parallax image generator 20 returns to step S152. The parallax image generator 20 extracts the parallax d(k, 2) of the pixel at the coordinate (k, n), i.e., the coordinate (k, 2) in the image from the image memory 17 (step S152).

After extracting the parallax d(k, 2) in step S152, the parallax image generator 20 stores an association between the parallax d(k, 2) and the coordinate (k, n×$P_y$), i.e., the coordinate (k, 2×$P_y$) in the image memory 17 (step S153).

During the repetition of the procedures in steps S152 to S155 as described above, when the parallax image generator 20 determines that $n > y'_{max}$ is satisfied in step S155, the parallax image generator 20 sets n=1 (step S156). The parallax image generator 20, for each k (k=1 to 640), stores the association between the coordinates between the coordinate (k, n×$P_y$) and the coordinate (k, (n+1)×$P_y$) and the parallax (d(k, n)+d(k, n+1))/2 in the image memory 17 (step S157). The parallax (d(k, 1)+d(k, n+1))/2 is a mean value of the parallax d(k, n) and the parallax d(k, n+1). That is, the parallax image generator 20 stores an association between the coordinates between the coordinate (k, 1×$P_y$) and the coordinate (k, 2×$P_y$) and the parallax (d(k, 1)+d(k, 2))/2 in the image memory 17. The parallax (d(k, 1)+d(k, 2))/2 is a mean value of the parallax d(k, 1) and the parallax d(k, 2).

Next, the parallax image generator 20 sets n=2 by adding 1 to n (step S158). The parallax image generator 20 determines whether $n+1 > y'_{max}$ is satisfied (step S159). When determining that $n+1 > y'_{max}$ is not satisfied, the parallax image generator 20 returns to step S157. The parallax image generator 20, for each k (k=1 to 640), stores an association between the coordinates between the coordinate (k, 2×$P_y$) and the coordinate (k, 3×$P_y$) and the parallax (d(k, 2)+d(k, 3))/2 in the image memory 17. The parallax (d(k, 2)+d(k, 3))/2 is a mean value of the parallax d(k, 2) and the parallax d(k, 3).

During the repetition of the procedures in steps S157 to S159, when the parallax image generator 20 determines in step S159 that $n+1 > y'_{max}$ is satisfied, the parallax image generator 20 ends the interpolation process. The parallax image generator 20 generates the interpolated parallax image in the same size as the image acquired by the acquisition unit 15 by performing the interpolation process as described above.

According to the embodiment described above, the parallax calculation apparatus 12 extracts the pixels arranged in the x-direction in the image space corresponding to the baseline direction of the three-dimensional coordinate space, at predetermined intervals in the y-direction from the standard image and the reference image. Then, the parallax calculation apparatus 12 calculates the parallax based on the extracted pixels. Thus, the number of pixels for measurement of parallax is reduced, decreasing overall processing load of the parallax calculation apparatus 12.

By using an unused processing capacity resulting from the decrease in the processing load for the measurement of parallax at short distances, the parallax at short distances may be measured with the same overall processing load. This enables highly accurate measurement for the pixels having the subject in a short distance.

In one embodiment the parallax calculation unit 19 extracts the pixels at predetermined intervals in the y-direction and calculates the parallax based on the extracted pixels. To calculate the parallax, the parallax calculation unit 19 performs the one-dimensional matching of the reference image and the standard image by comparing the pixels at the same location in the y-direction in the reference image and the standard image. The extraction of the pixels at predetermined intervals in the y-direction and the extraction of all pixels in the x-direction avoids losing the pixels of the standard image to be compared with the pixels extracted from the reference image. Thus, the accuracy of the one-dimensional matching is maintained. Accordingly, the parallax may be calculated preventing degradation of the accuracy while reducing procedures.

In one embodiment the parallax calculation unit 19 calculates the parallax without using the image of a previous frame captured by the stereo camera 11. This enables highly accurate calculation of the parallax even when a distance to the subject captured in the previous frame is not accurately calculated.

In one embodiment, the parallax image generator 20 performs the interpolation to the pixels for which the parallaxes are not calculated, based on the pixels adjacent to the pixels in the y-direction for which the parallaxes are calculated. Thus, the apparatus for controlling the vehicle may highly accurately control the vehicle by using the parallax image having the same amount of information as the original image, rather than by using the extracted parallax image having a smaller amount of information.

Another embodiment of the present disclosure will be described with reference to the accompanying drawings.

The stereo camera apparatus 10 according to one embodiment has the same schematic configuration as that according to the first embodiment illustrated in FIG. 3, and the parallax calculation apparatus 12 includes the acquisition unit 15, the controller 16, and the image memory 17. The controller 16 includes functional blocks such as the extraction unit 18, the parallax calculation unit 19, and the parallax image generator 20. Descriptions of the same configuration in a plurality of embodiments will be appropriately omitted.

In the above embodiment, the extraction unit 18 extracts lines from the image at predetermined intervals, that is, the pitch $P_y$ is fixed. According to another embodiment, on the other hand, the pitch $P_y$ differs depending on the y-coordinate in the image of the extraction source.

Figure 14A:
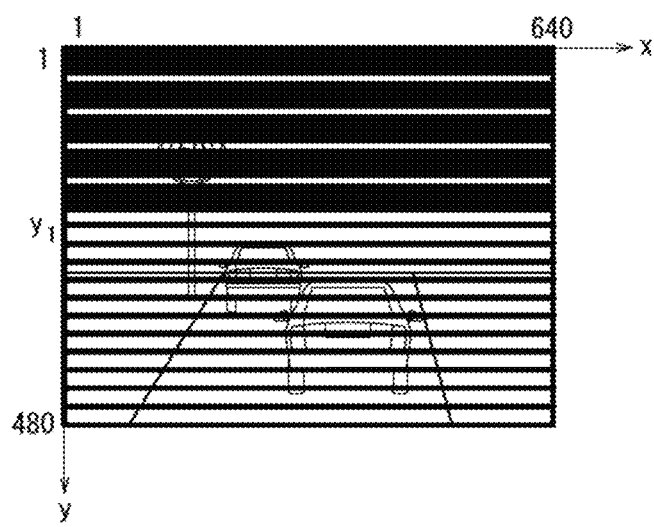
Figure 14B:
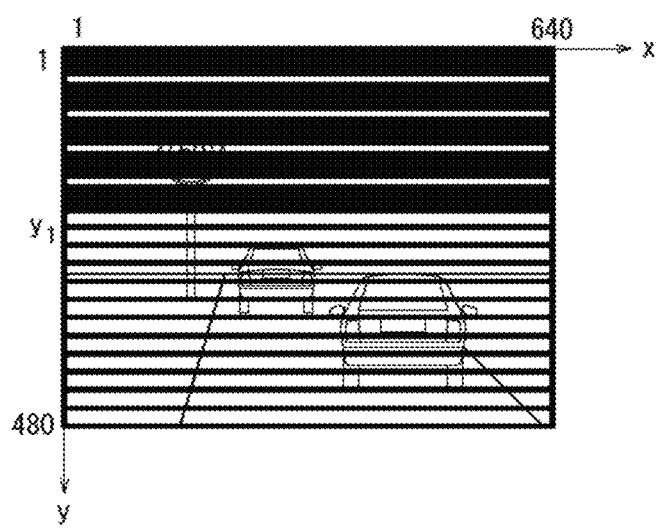

As illustrated in FIGS. 2A and 2B, the upper region of the image acquired by the stereo camera 11 mounted in the vehicle 1 is dominated by the sky. The upper region is an area capturing an upper part in the vertical direction in the three-dimensional coordinate space, i.e., an area in which the y-coordinate is smaller than $y_1$ in the images illustrated in FIGS. 14A and 14B. On the other hand, the lower region of the image often includes a subject such as another vehicle traveling ahead of the vehicle, an obstacle, and the like. The lower region is an area capturing below the vertical direction in the three-dimensional coordinate space, i.e., an area in which the y-coordinate is at least $y_1$ in the images illustrated in FIGS. 14A and 14B. Thus, in order to calculate the parallax in the lower region with higher accuracy than the upper region of the image in a downstream process, the predetermined intervals are dissimilated depending on the regions of the image as illustrated in FIGS. 14A and 14B. From the region $(0 \le y < y_1)$ capturing above the vertical direction in the three-dimensional coordinate space, the parallax calculation unit 19 extracts the lines with lower density than the region $(y_1 \le y \le y_{max})$ capturing below the vertical direction. Here, the "density" associated with the extraction of the lines refers to a ratio of the extracted lines to a predetermined number of consecutive lines. As the ratio of the extracted lines increases, it can be said that "the density of the extracted lines increases". For example, a reduction in the pitch $P_y$ corresponds to extraction of the lines at higher density.

According to this embodiment, the pitch $P_y$=u (u is a natural number) is used for the extraction from the region of $0 \le y < y_1$, and the pitch $P_y$=v (v is a natural number and v<u) is used for the extraction from the region of $y_1 \le y \le y_{max}$.

Here, the extraction by the extraction unit 18 to generate the extracted image will be described with reference to the flowchart of FIG. 15.

As illustrated in FIG. 15, the extraction unit 18 sets n=1 and $P_y$=u (step S231). The extraction unit 18 extracts the luminance value L(k, 1) of the pixel at the coordinate (k, n×u), i.e, the coordinate (k, 1×u) based on the pitch $P_y$=u (step S232). After extracting the luminance value L(k, 1) in step S232, the extraction unit 18 stores the association between the luminance value L(k, 1) and the coordinate (k, n), i.e., the coordinate (k, 1) in the image memory 17 (step S233).

After storing the association between the luminance value and the coordinate in the image memory 17 in step S233, the extraction unit 18 sets n=2 by adding 1 to n (step S234) and determines whether n×$P_y$>$y_1$ is satisfied (step S235). When determining that n×$P_y$>$y_1$ is not satisfied, the extraction unit 18 repeats the procedures in steps S232 to S235 while maintaining the pitch $P_y$=u.

When determining that n×$P_y$>$y_1$ is satisfied in step S235, the extraction unit 18 changes the pitch $P_y$ to v (step S236). Next, the extraction unit 18 sets the last n that satisfies n×$P_y$≤$y_1$ to $n_1$ and extracts the luminance value L(k, n) of the pixel at the coordinate (k, $n_1$×u+(n−$n_1$)×v) from the image (step S237). Subsequently, the extraction unit 18 stores the association between the luminance value L(k, n) and the coordinate (k, n) in the image memory 17 (step S238). After storing the association between the luminance value L(k, n) and the coordinate (k, n) in the image memory 17 in step S238, the extraction unit 18 sets n=n+1 by adding 1 to n (step S239). Then, the extraction unit 18 determines whether $n_1$×u+(n−$n_1$)×v>$y_{max}$ is satisfied (step S240).

When determining that $n_1$×u+(n−$n_1$)×v>$y_{max}$ is not satisfied in step S240, the extraction unit 18 again repeats the procedures in steps S238 to S240. When determining that $n_1$×u+(n−$n_1$)×v>$y_{max}$ is satisfied in step S240, the extraction unit 18 ends the extraction process.

Although the method of generating the interpolated parallax image by interpolating the extracted parallax image is similar to those of other embodiments, the parallax image generator 20 does not need to perform the interpolation to the upper region of the parallax image.

According to the embodiment as described above, the extraction unit 18 extracts the lines at different intervals depending on the regions of the image, and extracts the lines at higher density in the region capturing a lower area than the region capturing an upper area. Thus, the parallax calculation process is reduced for the region dominated by distant objects and the sky, while the parallax calculation process is performed with high accuracy in the region that often captures subjects such as other vehicles and obstacles.

In one embodiment, the parallax calculation unit 19 calculates the parallax by using the extracted image generated by the extraction unit 18 and stored in the image memory 17. However, this is not restrictive. For example, the parallax calculation unit 19 may calculate the parallax by using the image acquired by the acquisition unit 15. In this case, the parallax calculation unit 19 uses a rectangular block composed of the pixels extracted at the intervals of the pitch $P_y$ from the reference image acquired from the acquisition unit 15. The parallax calculation unit 19 calculates the parallax by performing the one-dimensional matching between the block of pixels extracted from the reference image and a block including the pixel of the reference image at the y-coordinate equal to the y-coordinate of the block of the pixels extracted from the reference image. Then, the parallax image generator 20 sets the calculated parallax to the parallax of the position in the interpolated parallax image corresponding to the position in the reference image of the extraction source.

The parallax image generator 20 interpolates, to a position corresponding to a pixel of the line for which parallax has not been calculated, the mean value of the parallax of a first pixel adjacent to the pixel on one side in the y-direction and the parallax of a second pixel adjacent to the pixel on the other side in the y-direction, but the interpolation method is not limited to this method. For example, the parallax image generator 20 may interpolate, to the position of the pixel of the line for which parallax has not been calculated, the same value as the parallax of a pixel adjacent to the pixel on one side in the y-direction. In this case, the parallax image generator 20 stores the association between the coordinate between the coordinate (k, n×$P_y$) and the coordinate (k, (n+1)×$P_y$) and the parallax d(k, n×$P_y$) of the coordinate (k, n×$P_y$).

The parallax image generator 20 may interpolate the parallax, by performing linear interpolation between the parallax of the first pixel and the parallax of the second pixel to the position corresponding to the pixel of the line for which the parallax has not been calculated. The first pixel has a measured parallax and is adjacent to one side of the position in the y-direction of the pixel for which the parallax has not been measured. The second pixel has a measured parallax and adjacent to the other side of the position in the y-direction of the pixel for which the parallax has not been measured.

Although in the above embodiment the extraction unit 18 sequentially extracts from the line with a smaller y-coordinate, the lines may be extracted in any appropriate order. Also, although the parallax image generator 20 performs the interpolation from the line with a smaller y-coordinate, the lines may be subjected to the interpolation in any appropriate order.

In one embodiment, the parallax image generator 20 generates the extracted parallax image from the extracted image and generates the interpolated parallax image by performing the interpolation to the extracted parallax image. However, a distance image generator, for example, in place of the parallax image generator 20 may generate an extracted distance image indicating a distance to the subject in each pixel based on the parallax calculated based on the extracted image, and generate an interpolated distance image by performing interpolation to the extracted distance image.

In this case, the distance image generator calculates a distance $Z_{xy}$ from the equation (3) set forth below, by using the parallax d(x, y) of a pixel at each coordinate (x, y) calculated by the parallax calculation unit 19, baseline lengths b of the two cameras, and focal lengths f of the cameras. The distance $Z_{xy}$ is a distance to the subject represented by the pixel at the coordinate (x, y).

$$Z_{xy} = b \cdot f / d_{xy} \quad (3)$$

Although in the embodiment the pitch $P_y$ is either u or v, the pitch $P_y$ is not limited to two values but may have three or more values.

According to the present disclosure, the terms "image", "image data" and "image information" may be appropriately altered by other terms.

The invention claimed is:

1. A parallax calculation apparatus comprising:
    an acquisition unit configured to acquire a standard image and a reference image captured by a stereo camera; and
    a controller configured to extract, from each of the standard image and the reference image, lines from a plurality of lines parallel to a first direction in an image space corresponding to a baseline direction of a three-dimensional coordinate space, and to calculate a parallax between the standard image and the reference image based on a plurality of pixels included in the extracted lines, wherein
    an upper region and a lower region of the image space respectively correspond to an upper region and a lower region across a vertical direction in the three-dimensional coordinate space,
    a density of lines extracted by the controller from the lower region in the image space is higher than a density of lines extracted from the upper region, and
    the parallax between the standard image and the reference image is a difference in a position of each pixel of the reference image from a position of each pixel of the standard image.

2. The parallax calculation apparatus according to claim 1,
    wherein the controller is configured to regularly extract the lines from the plurality of lines in a second direction perpendicular to the first direction.

3. The parallax calculation apparatus according to claim 2,
    wherein the controller extracts the lines in recurring periods from the plurality of lines in the second direction perpendicular to the first direction.

4. The parallax calculation apparatus according to claim 1,
    wherein the first direction corresponds to the baseline direction in the three-dimensional coordinate space.

5. The parallax calculation apparatus according to claim 1,
    wherein, for parallax at positions of pixels in lines other than the extracted lines, the controller does not perform interpolation in the upper region and performs interpolation in the lower region based on calculated parallaxes at positions adjacent to the pixels in a second direction orthogonal to the first direction and generates a parallax image indicating a distance to a subject.

6. The parallax calculation apparatus according to claim 1,
    wherein the controller generates a parallax image by interpolating the parallax corresponding to each pixel in an unextracted line based on the parallax of the extracted lines surrounding the unextracted line.

7. The parallax calculation apparatus according to claim 6,
    wherein the controller sets the parallax of each pixel in the unextracted line to a mean value of the parallaxes of the extracted lines adjacent to the unextracted line in a second direction orthogonal to the first direction.

8. The parallax calculation apparatus according to claim 6,
    wherein the controller sets the parallax of each pixel in the unextracted line to one of parallaxes of two extracted lines adjacent to the unextracted line in a second direction orthogonal to the first direction.

9. The parallax calculation apparatus according to claim 6,
    wherein the controller performs linear interpolation to the parallax corresponding to each pixel in the unextracted line based on the parallaxes of two extracted lines adjacent to the unextracted line in a second direction orthogonal to the first direction.

10. A stereo camera apparatus comprising:

a stereo camera; and a parallax calculation apparatus including a controller configured to extract, from each of a standard image and a reference image captured by the stereo camera, lines from a plurality of lines parallel to a first direction in an image space corresponding to a baseline direction of a three-dimensional coordinate space, and to calculate a parallax between the standard image and the reference image based on a plurality of pixels included in the extracted lines, wherein an upper region and a lower region of the image space respectively correspond to an upper region and a lower region across a vertical direction in the three-dimensional coordinate space, a density of lines extracted by the controller from the lower region in the image space is higher than a density of lines extracted from the upper region, and the parallax between the standard image and the reference image is a difference in a position of each pixel of the reference image from a position of each pixel of the standard image.

11. A vehicle equipped with a stereo camera apparatus comprising:

a stereo camera; and a parallax calculation apparatus including a controller configured to extract, from each of a standard image and a reference image captured by the stereo camera, lines from a plurality of lines parallel to a first direction in an image space corresponding to a baseline direction of a three-dimensional coordinate space, and to calculate a parallax between the standard image and the reference image based on a plurality of pixels included in the extracted lines, wherein an upper region and a lower region of the image space respectively correspond to an upper region and a lower region across a vertical direction in the three-dimensional coordinate space, a density of lines extracted by the controller from the lower region in the image space is higher than a density of lines extracted from the upper region, and the parallax between the standard image and the reference image is a difference in a position of each pixel of the reference image from a position of each pixel of the standard image.

12. A parallax calculation method performed by a parallax calculation apparatus equipped with an acquisition unit and a controller, the parallax calculation method comprising:

a step in which the acquisition unit acquires a standard image and a reference image captured by a stereo camera; and a step in which the controller extracts, from each of the standard image and the reference image, lines from a plurality of lines parallel to a first direction in an image space corresponding to a baseline direction of a three-dimensional coordinate space, and calculates a parallax between the standard image and the reference image based on a plurality of pixels included in the extracted lines, wherein an upper region and a lower region of the image space respectively correspond to an upper region and a lower region across a vertical direction in the three-dimensional coordinate space, a density of lines extracted by the controller from the lower region in the image space is higher than a density of lines extracted from the upper region, and the parallax between the standard image and the reference image is a difference in a position of each pixel of the reference image from a position of each pixel of the standard image.

\* \* \* \* \*